E. H. Hancock,
Water Gate,
Nº 25,330.    Patented Sept. 6, 1859.
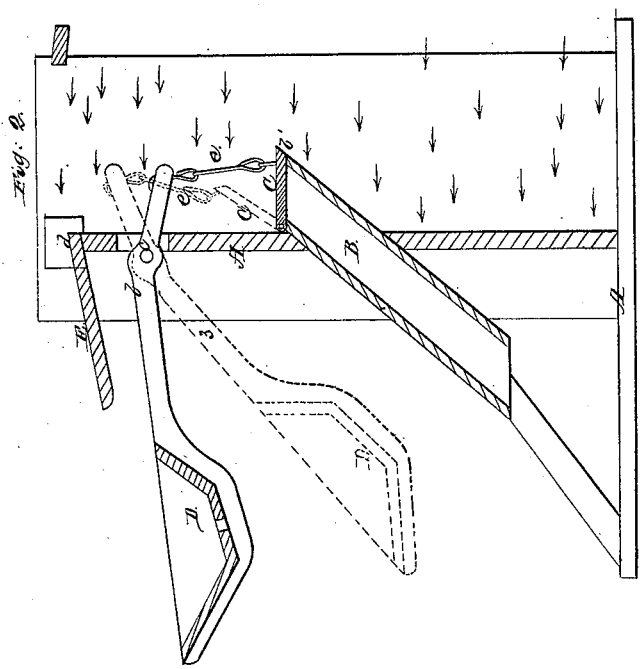
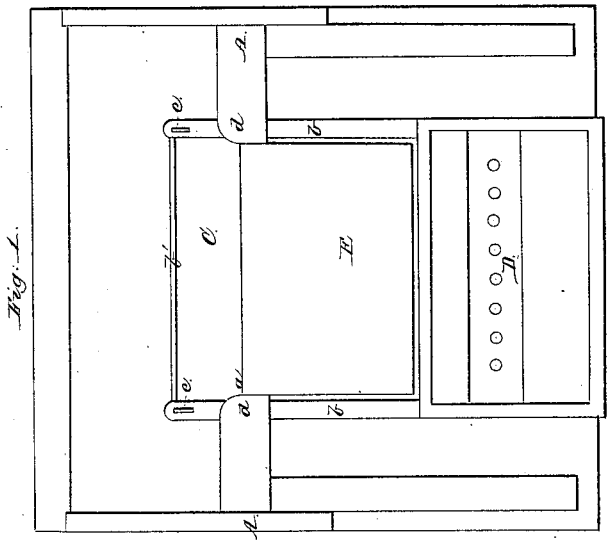
Witnesses:
Inventor
E. H. Hancock

UNITED STATES PATENT OFFICE.

E. H. HANCOCK, OF AUGUSTA, GEORGIA.

FLOOD-GATE.

Specification of Letters Patent No. 25,330, dated September 6, 1859.

*To all whom it may concern:*

Be it known that I, E. H. HANCOCK, of Augusta, in the county of Richmond and State of Georgia, have invented a new and useful Improvement in Flood-Gates; and I do hereby declare that the following is a full, clear, and exact description of the same, reference being had to the accompanying drawings, forming part of this specification, in which—

Figure 1 is a top view of my improved flood gate. Fig. 2 is a vertical longitudinal section of the same.

Similar letters of reference in each of the several figures indicate corresponding parts.

The nature of my invention consists in a flood or dam gate which is so arranged that as long as the water of the dam exerts a uniform pressure and flows regularly over the top of the structure to which the gate is attached, it will have a tendency to remain firmly closed but as soon as the water of the dam rises and flows over said structure with such a rapidity as to cause an overflowing and consequent washing down of the embankment, it will suddenly open and allow a free escape of the water through the waste passage.

To enable others, skilled in the art to make and use my invention, I will proceed to describe its construction and operation.

A represents the main structure or support of my improved flood or dam gate. This structure is of a character to dam up the stream completely except at the point where the waste gate is arranged at which point an inclined waste passage or flat pipe B is provided. The top of this pipe is parallel with the horizon, and the gate C rests horizontally upon it, being hinged at $a$, and loose at $b^1$. The top of the pipe stands on the outside of the structure A and the bottom on the inside, therefore the gate is situated within the space occupied by the body of water.

On the inside of the structure A is arranged a perforated concave or trough D it being suspended on pivoted levers $b$—$b$ said levers having their fulcra at $c$ or at $d$—$d$ in the structure A the latter points being preferable as the dam cannot leak below the top edge of the structure A when the levers are pivoted at the top of the structure whereas it is liable to leak at $c$ as the necessary up and down movement of the levers require, that enlarged openings shall be formed. The inner ends of the levers are connected to the top of the gate by means of chains $e\ e$ or other suitable means as represented.

From the top of the structure A, down to within a short distance of the trough a chute E extends. This chute serves to conduct the water into the trough, which owing to being perforated at its bottom will, so long as a uniform flow of water is maintained, allow the water to escape as fast as it flows into the trough, and thus a filling of the trough, consequent tilting of the same and opening of the waste gate avoided, until a sudden increase of the flow of water ensues, when the discharge through the perforations will not be equal to the supply to the trough, and consequently the trough will fill and be caused to tilt under its weight, and thus open the waste gate so as to allow a free escape of water through the waste passage. As soon as the freshet subsides the gate will close automatically giving to it superior gravity over that of the trough.

What I claim as my invention and desire to secure by Letters Patent is—

The combination of the flood or dam gate C tilting trough D and the draining structure A—B or its equivalent substantially as and for the purpose herein set forth.

The above specification of my improvement in flood gates signed by me this 19th day of April, 1859.

E. H. HANCOCK.

Witnesses:
G. YORKE ATLEE,
H. H. YOUNG.